United States Patent Office 3,511,891
Patented May 12, 1970

3,511,891
OLIGOMERISATION PROCESS
Keith Andrew Taylor and John Alex Leonard, Runcorn, England, assignors to Imperial Chemical Industries Limited, Millbank, London, England, a corporation of Great Britain
No Drawing. Filed May 19, 1967, Ser. No. 639,659
Claims priority, application Great Britain, Dec. 21, 1966, 57,122/66, Patent 1,131,146
Int. Cl. C07c *3/10, 11/02*
U.S. Cl. 260—683.15
4 Claims

ABSTRACT OF THE DISCLOSURE

A process for the oligomerisation of monoalkenes in which the monomer is contacted in the liquid phase with a homogeneous catalyst formed from a Group VIII metal compound, a ligand containing a donor atom of Group VB and a Lewis acid compound. The components of the catalyst may be added to the reaction mixture singly or as one or more pre-formed complexes. For example, propene and butene are co-dimerised using a bistrialkylphosphine nickel halide complex/ethyl aluminium dichloride mixture as catalyst. The catalyst may be stabilized by contacting with an olefin. Catalysts of reduced isobutylene polymerization activity are obtained by using an Al/Ni atomic ratio of 3/1 to 5/1 and conditioning with an isobutene-free monoalkene.

---

This invention relates to a process for the oligomerisation of monoalkenes and, in particular to the dimerisation and co-dimerisation of such alkenes.

According to the present invention a process for the oligomerisation of monoalkenes comprises contacting the monomer with a catalyst formed from a compound of a metal of Group VIII of the Periodic Table, a ligand containing a donor atom or atoms of Group V–B of the Periodic Table and a compound capable of acting as a Lewis acid under the conditions of the process.

Preferred Lewis acid compounds are organo aluminium compounds such as the chlorides, bromides and alkyl chlorides or bromides of aluminium; but boron, aluminium, gallium, indium, titanium, zirconium and iron halides or organo halides may also be used.

By the Periodic Table we mean the Long Periodic Table, as shown inside the back cover of "General and Inorganic Chemistry" by Partington, published by Mc-Millan, 2nd Edition.

Preferably, the Group VIII metal compound is one in which the metal is combined with an anionic ligand. Suitable compounds include salts of organic acids, such as naphthenic or stearic acids or co-ordination compounds, such as metal acetylacetonates; but salts of inorganic acids may also be used, particularly in anhydrous form.

By the term "ligand containing a donor atom or atoms of Group V–B" we mean a compound the whole or part of which is capable of bonding to a metal atom. A preferred Group V–B donor atom is phosphorus.

Each ligand containing a donor atom or atoms of Group V–B may be mono- or poly-dentate. Suitable ligands include compounds of the general formula: $YR_n$, $n=2$ or 3, Y is a donor atom of Group V–B the substituents R, which may be the same or different, are hydrogen atoms or monovalent radicals, such as hydrocarbyl radical for example alkyl, alkenyl, aryl, alkaryl, aralkyl and cycloalkyl, or a substituted derivative thereof. R may also be halogen, pseudo-halogen, —OR′, —SR′, or —NR′$_2$ where R′ is a substituted or unsubstituted hydrocarbyl radical. When both R and R′ are hydrocarbyl radicals, they may be the same or different.

Also included are compounds of the general formula:

$$R_m—Y—R''—Y—R_m$$

where $m=1$ or 2, Y and R have the same significance, and R″ is a direct linkage or a divalent radical, for example —CH$_2$—, —(CH$_2$)$_n$—. When two Y atoms are present in the ligand or two or more ligands of the type $YR_n$ are used the Y atoms may be the same or different.

The donor atom or atoms of Group V–B may be incorporated in an aromatic ring. Especially useful ligands are organic or halogen substituted phosphines or phosphites.

Examples of suitable ligands are:

$\phi_2$P—CH$_2$—CH$_2$—P$\phi_2$
$\phi_2$P—CH$_2$—P$\phi_2$
$\phi$S—CH$_2$—CH$_2$—P$\phi_2$
P(Bu)$_3$
P(Cy)$_3$
P$\phi_3$
As$\phi_3$
Sb$\phi_3$
P(CH$_2$Cl)$_3$
P(OEt)$_3$
P(NMe$_2$)$_3$
P$\phi$Cl$_2$
H$_2$N—CH$_2$—CH$_2$—NH$_2$

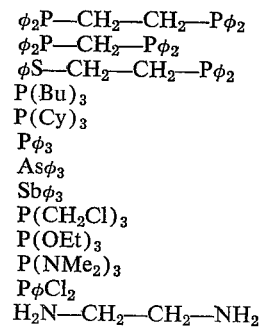

where:
$\phi$=phenyl
Me=methyl
Et=ethyl
Bu=n-butyl
Cy=cyclohexyl

In one form of our invention, the Group VIII metal compound and ligand containing a Goup V–B donor atom are chosen so that they form a complex species containing a metal of Group VIII of the Periodic Table of the Elements in which at least one of the co-ordination sites of the metal is occupied by a ligand containing a donor atom or atoms of Group V–B of the Periodic Table of the Elements linked directly to the metal, and at least one other of the said sites is occupied by an anionic ligand.

Within the term "complex species containing a metal of Group VIII" we mean to include any species in which such a metal atom is co-ordinated to at least one of each of the ligands previously mentioned plus such other ligand or ligands as are necessary to satisfy the appropriate co-ordination number of the metal. The said other ligands may be anionic, cationic or neutral and may be mono- or poly-dentate. Thus the species may be neutral, positively or negatively charged, in toto, so that it may take the form of a complex compound as such or, alternatively, it may exist as a complex cation or anion, in which case it will be associated with one or more other anions or cations. Suitable Group VIII metals include nickel and cobalt. Nickel is a particularly effective metal.

The specified anionic ligand or ligands may be, for example, Cl⁻, Br⁻, I⁻, SCN⁻, NO$_3$⁻, naphthenate, stearate, acetylacetonate and when more than one is present they may be the same or different.

When the Group VIII metal compound and donor atom ligand are chosen as above, the complex formed may be isolated (hereinafter referred to as a preformed Group VIII metal complex). Thus, it may be convenient to use the catalyst as a two-component mixture, i.e. preformed Group VIII metal complex/Lewis acid mixture.

Group VIII metal complexes which may be used in this way, may be prepared by well-established published procedures, for examples, see Jensen, et al, Acta Chemica Scandinavica, 17, 1963, 1115–1125. Examples of such complexes include:

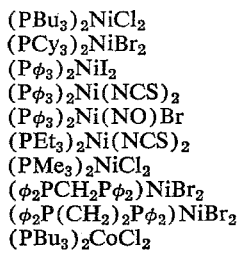

Whereas it is convenient to use the appropriate stoichiometric proportions of nickel compound and donor atom ligand when preparing the defined Group VIII metal complexes, it is within our invention to use non-stoichiometric proportions of these two components of our catalyst system. It has been found that ratios of donor atom ligand: Group VIII metal in the range 0.2:1 to 20:1 may be used (expressed in g. atoms of ligand and metal) especially when isolation of the Group VIII metal complex is not envisaged.

Although the components of our catalyst (i.e. Group VIII metal compound/donor atom ligand/Lewis acid or Group VIII metal complex/Lewis acid) may be added to the oligomerisation reaction mixture in any order, if they are mixed before being brought into contact with the monomer, there may be some reduction of activity of the catalyst which, under particularly adverse conditions, may be accompanied by deposition of the Group VIII metal.

This loss of activity of the mixture is accelerated by rise of temperature of the mixture and also by undue delay between mixing the components and bringing the mixture into contact with the monoalkene monomer. Thus the effect may be kept to a minimum by maintaining the mixture at low temperature (e.g. <0° C.) until it is contacted by the monomer, or by adding the monomer immediately after the Lewis acid compound, but these procedures require careful control of conditions and/or considerable manipulative skill to be successful. However, the effect may be conveniently reduced or obviated by contacting the Group VIII metal compound/donor atom ligand mixture or Group VIII metal complex with an olefin before or during the addition of the Lewis acid compound.

Accordingly a preferred process for the oligomerisation of monoalkenes according to our invention comprises contacting the Group VIII metal compound/donor atom ligand mixture or Group VIII metal complex with an olefin or mixture of olefins before or during addition of the Lewis acid compound. For the sake of simplicity this step will hereinafter be referred to as the "stabilising process."

It is often convenient to contact the said mixture or complex with the olefin or olefins which comprise the monomer, but any olefin may be used for the purpose. However, where possible one should avoid using a branched chain olefin which is liable to rapid polymerisation with the Lewis acid component, e.g. isobutene with ethyl aluminium dichloride, especially when the monoalkene which is to be oligomerised contains such as olefin.

The stabilising process may be carried out in any convenient way, for example:

(1) The Group VIII metal compound and ligand may be mixed and treated with a gaseous or liquid olefin before or simultaneously with the addition of the Lewis acid compound.

(2) A gaseous olefin, for example ethylene or propene, may be bubbled through a solution of a Group VIII metal complex before addition of the Lewis acid compound.

(3) The Group VIII metal complex may be dissolved in a liquid olefin, for example liquid n-butene, or recycled heavy ends from subsequent dimer recovery stages, and the Lewies acid compound added to the resulting solution.

(4) The Group VIII metal complex or Group VIII metal compound and donor atom ligand may be dissolved in a non-olefinic solvent, e.g. chlorobenzene, and a liquid olefin and a Lewis acid compound added simultaneously.

Once a stabilised catalyst mixture has been prepared by the aforementioned stabilising process, it appears to be stable for at least several hours, as indicated by the absence of discolouration or precipitation from the solution.

As previously mentioned, the catalyst mixture may also be stabilised by keeping it below 0° C. We have also found that with certain mixtures, for example, nickel bis trialkylphosphine dihalide/aluminium alkyl halide, a single complex may be isolated on cooling the solution to $-78°$ C. These complexes have been shown to contain the two components of the mixture in definite proportions which may be expressed as an aluminium/nickel ratio. In the case of a $(Bu_3P)_2NiCl_2/EtAlCl_2$ mixture, a blue complex having an aluminium/nickel ratio of 3/1 may be isolated. This complex may be conveniently stored at temperatures between $-20°$ C. and $=80°$ C. until required. When such a complex is added to a suitable liquid monomer or monomer solution and the solution allowed to warm to ambient temperature, the blue complex turns yellow and then acts as an oligomerisation catalyst. This method of catalyst preparation allows close control of the ratio of aluminium to nickel which may be extremely desirable under certain conditions, as discussed later.

Monoalkenes which may be oligomerised by the process of our invention include ethylene, propene, but-1-ene and but-2-ene (cis and trans), or mixtures of the same. Alkanes may be present together with the alkene or alkenes. For example propylene may be made to yield hexenes and higher oligomers, but-1-ene to yield octenes, and mixtures of but-1-ene or but-2-enes with propylene to yield mixtures of hexenes, heptenes and octenes. However, it is found with most catalyst systems that in the co-dimerisation of propylene and n-butene, the butene should be present in excess if a satisfactory yield of co-dimer is to be obtained.

Commercially available butene streams which may be used in conjunction with propene as a feedstock in our process often contain iso-butene, which may polymerise in the presence of certain Lewis acids, particularly ethyl aluminium dichloride, a preferred Lewis acid in the process of our invention. When such polymerisation occurs, it often results in the formation of solid or semi-solid products which cause manipulative difficulties, especially when the process is worked continuously.

This may be overcome by removal of the iso-butene from the feedstock by distillation or the like, or by using diethyl aluminium monochloride as the Lewis acid. However, physical separation of the iso-butene may be tedious and costly and although use of diethyl aluminium monochloride greatly reduces the tendency of the iso-butene to polymerise, it also reduces the overall activity of the catalyst mixture.

An alternative method for alleviating the above difficulty makes use of the discovery that when a mixed n-butene/iso-butene stream is oligomerised by our process, even in the presence of Lewis acids such as ethyl aluminium dichloride, the tendency for isobutene polymerisation may be reduced, provided that the catalyst mixture is conditioned by being kept in contact with an olefin free of iso-butene for a predetermined time before any iso-butene is introduced into the system.

The catalyst mixture is preferably prepared using the stabilising process described above, provided that the stabilising olefin used is free of isobutene.

The aforementioned "predetermined time" will depend upon various factors, such as the exact nature of the catalyst and the ratio of the two components, but is commonly in the range 15 to 60 minutes. The time is not critical, provided that it is sufficient for the catalyst mixture to become so conditioned that it has considerably less activity in the polymerisation of the isobutene.

The minimum conditioning time necessary may be readily determined by allowing separate portions of the appropriate mixture of components to stand in contact with the conditioning olefin for periods of, say, 0, 15, 30 and 45 minutes, at the end of which time some iso-butene is admitted to the system. The shortest period of contact after which no polymer or an acceptable amount of polymer is formed may then be used as the predetermined time in subsequent runs with that catalyst system.

The exact mechanism of this conditioning process is not known; but, without prejudice to the present invention, it is thought that it allows any Lewis acid in excess of that required for the production of an effective catalyst species to dissipate, so that it is no longer available to polymerise the iso-butene when it is finally admitted to the system.

In the above paragraphs, although only isobutene has been referred to, it will be appreciated that these remarks would apply equally to any branched-chain olefin which polymerizes readily with a cationic initiator, such as a Lewis acid.

As the process is preferably performed in the liquid phase, it is sometimes convenient to add to the reaction mixture an inert solvent for both the monomer and catalyst. Hydrocarbon or halogenated hydrocarbon solvents may be used, for example, paraffins, chlorobenzene and methylene chloride. However, the final choice of solvent will be dictated principally by the catalyst used. For example the presence of chlorobenzene enhances the activity of the catalyst. It is also possible to apply the process in the absence of inert solvent, e.g. by operating in liquid butenes or recycled oligomer or heavy ends.

The process may be carried out at atmospheric pressure; but super-atmospheric conditions may be used, for example up to 300 atmospheres or even higher. The pressure may be applied or autogenous, and final choice of pressure will depend upon the monomer/catalyst combination used. For example, pressures between atmospheric and 50 ats. are suitable for dimerisation of propene and butene with a nickel phosphine halide/ethyl aluminium halide catalyst. The reaction may also be performed at a subatmospheric partial pressure, e.g. 0.25 atmospheres, for example by introducing an inert diluent into the reaction chamber. The reaction must be carried out under oxygen-free conditions.

The temperature of the reaction is preferably controlled between $-25°$ C. and $100°$ C., but higher temperatures may be used. Preferably temperatures in the range $10°$ to $80°$ C. and especially in the range $30°$ to $70°$ C. are used.

The concentration of Group VIII metal in the liquid reactants will normally lie between $10^{-3}$ mmole and $10^3$ mmoles/litre and, preferably between $10^{-2}$ mmoles and 10 mmoles/litre.

However, we have found that in some instances the concentration of the Group VIII metal in the liquid reactants has a value above which further increase does not produce a worthwhile increase in the rate of the oligomerisation reaction.

This value, which will be hereinafter referred to as the maximum effective concentration, varies with the particular compounds used in the catalyst composition and upon the nature of the monomer or monomers; but the value for any given catalyst/monomer mixture may be determined by a series of simple experiments using the appropriate reactants. For example, when dimerising propene with a catalyst combination of $(PBu_3)_2NiCl_2$ and $NiAlCl_2$ the maximum effective concentration of the former component is in the range 0.5 to 2.0 mm./litre, expressed with respect to nickel.

The concentrations given above are calculated on the average volume of liquid reactants, since the volume increases during the reaction.

The molar ratio of Lewis acid compound/Group VIII metal will normally lie between 1/10 and 1000/1 and preferably lies between 1/3 and 200/1; but in general it is desirable that the concentration of Lewis acid compound should be kept as low as possible, consistent with the efficient formation of the catalyst species. This is especially important when any readily polymerisable olefin, such as isobutene, is present in the feedstock.

With certain of our catalyst systems, e.g. those using aluminium alkyl halide/nickel phosphine halide mixtures, the Lewis acid/Group VIII metal ratio is conveniently expressed as an Al/Ni ratio. For such systems, Al/Ni ratios from 3/1 to 5/1 are preferred, especially when propene and butene are being co-dimerised in the presence of isobutene. As already mentioned, with excessive concentrations of Lewis acid, e.g. substantially greater than 5/1 ratio, when isobutene is present large amounts of poly(isobutene) tend to be produced. When isobutene is absent such ratios tend to favour the production of heavy ends, e.g. trimer, but when such products are not objectionable, Al/Ni ratios of up to 20/1 may be used. The possibility of isolation of a combined Lewis acid/Group VIII metal complex of the type discussed earlier should be borne in mind, especially when isobutene is present, as it allows very close control of the Al/Ni ratio.

We have found that by a combination of catalyst conditioning and choice of Al/Ni ratio, up to 80% of the isobutene in a mixed butene/propene stream may be recovered unreacted after the oligomerisation process.

The products of our oligomerisation process may be worked up in a variety of ways. For example, (a) Oligomer may be recovered by first distilling off unconverted monomer from the crude product and then distilling the oligomer from catalyst and heavy ends which may then be recycled through the process, (b) The catalyst may be deactivated before distillation of the crude product, or (c) The catalyst may be destroyed and then washed out of the product before distillation.

The process may be operated on a continuous basis using a mild steel reactor, variants such as (a) above being particularly suited to such operations. The continuous process may be applied, for example, by using an elongated reactor or a series of reactors in a cascade. This would enable the propylene in, say, a propylene/butene dimerisation to be introduced at several points along the reactor or into several reactors in series. It will be appreciated that any unreacted olefin may be recycled through the process.

The products of our process are suitable as a feedstock for the well-known hydroformylation process wherein an olefin or mixture of olefins is reacted with hydrogen and carbon-monoxide in the presence of a suitable catalyst, to produce the appropriate aldehydes and/or alcohols. Usually, the product is mainly aldehyde which requires a separate hydrogenation to form alcohols, commonly referred to as OXO alcohols.

It has been found that the products of our oligomerisation process require only distillation to separate unconverted monomer and heavy ends before use in a hydroformylation process. After hydrogenation of the product the derived alcohols are very suitable for the production of high quality plasticiser esters.

The invention will be illustrated by the following examples.

EXAMPLE 1

Bis(tributylphosphine) nickel dichloride (0.2 g.) was dissolved in 30 ml. of chlorobenzene under an atmosphere of nitrogen in a creased flask of 250 ml. capacity fitted with a stirrer. The stirrer system was kept airtight by a paraffin seal. The solution was cooled to between $-10°$ C. and $0°$ C. and saturated with propylene gas of 99% mole minimum purity. The gas was dried and deoxygenated before being passed into the flask via a rotameter gauge. Ethyl aluminium dichloride (0.2 ml.) was then added and the red colour of the nickel complex changed immediately to deep blue and, after 1-2 minutes, to yellow. At this stage there was a rapid increase in temperature and the exit flow of propylene fell rapidly. The temperature of the reactants was kept between $-20°$ C. and $0°$ C. by external cooling, and it was found necessary to increase the inlet flow of propylene to 400 litres/hr. to obtain a positive exit flow. After 12 mins. the propylene supply was cut off and air admitted to the reaction vessel to deactivate the catalyst. The products were distilled to yield 73 g. of herenes (B.P. 58–75° C.) and 36 g. of a residue comprising chlorobenzene containing a little (ca. 2 g.) of higher oligomers of propylene.

The hexene fraction was hydrogenated using Adams catalyst and the mixture of hexanes so produced was analysed by means of gas/liquid chromatography. The hexanes contained 29% 2,3-dimethyl butane, 67% 2-methyl pentane and 4% n-hexane. The rate of conversion was 16.6 kg. of total oligomers/hr./g. Ni.

EXAMPLES 2–9

The general procedure of Example 1 was followed using propylene gas, with the results shown in Table 1. The figures under "Hexane isomer ratio" refer to proportions of 2,3-dimethyl butene, 2-methyl pentane and n-hexane in that order. The catalysts are identified by letters A–E as follows:

(A) Bis(tributylphosphine)nickel dichloride
(B) Bis(tricyclohexylphosphine)nickel dibromide
(C) Bis(triphenylphosphine)nickel di-iodide
(D) Bis(triphenylphosphine)nickel di-isothiocyanate
(E) Bis(triphenylphosphine)nickel nitrosyl bromide.

EXAMPLE 10

The general procedure of Example 1 was followed, using butene-1, with 0.5 g. of bis(tributylphosphine)nickel dichloride and 0.5 ml. of ethyl aluminium dichloride, 35 ml. of chlorobenzene. The temperature was controlled at $-4°$ C. for 300 minutes, giving a conversion rate of 0.06 kg./hr./g. Ni. The product comprised approximately 18 g. of octenes.

EXAMPLE 11

0.5 g. of bis(tributylphosphine)nickel dichloride was dissolved in 10 ml. of chlorobenzene under an atmosphere of nitrogen in a creased flask of 250 ml. capacity fitted with a stirrer as previously described. About 150 ml. of cis butene-2 was condensed into the flask by means of a cold finger at $-75°$ C. The resulting solution was saturated with propylene gas, which was passed into the solution at 30 litres/hr., and then 0.6 ml. of ethyl aluminium dichloride was added. The colour changes were as described in Example 1; but no external cooling was necessary. The temperature rose steadily from $-10°$ C. to $32°$ C. over a period of 71 mins., at which stage the reaction was stopped. The liquid product (137 g.) was removed from the flask and the excess liquid butenes allowed to evaporate. The remaining liquid weighed 106 g. of which 64 g. proved to be $C_6$–$C_8$ olefins. The proportions were found to be 33% $C_6$, 44% $C_7$ and 22% $C_8$.

EXAMPLES 12–16

The general procedure of Example 11 was followed using mixtures of propylene and a butene isomer, with the results shown in Table 2.

EXAMPLE 17

1.65 g. of bis(tributylphosphine)nickel dichloride was dissolved in 10 ml. of chlorobenzene in an apparatus as described previously. 50 ml. of butene-1 and 50 ml. of iso-butene were condensed into the flask. Nitrogen was passed through the system slowly as 1.5 mls. of diethyl aluminium chloride was added, and then propylene was passed into the solution at 30 litres/hr. for 140 minutes. The temperature rose initially from $-15°$ C. to $-5°$ C. and fell to $-8 \pm 2°$ C. during the remainder of the reaction time.

The mixture, distilled and analysed as before gave 35.8 g. of $C_6$ products and 10 g. of $C_7$ products. No polymeric product was detected.

EXAMPLE 18

A solution of bis(tributylphosphine)nickel dichloride (0.1 g.) in chlorobenzene (50 ml.) was treated with ethyl aluminium dichloride (0.35 g.) at room temperature. After 4 minutes the solution became brown and finely divided nickel was deposited. This example demonstrates the mixing of nickel complex and Lewis acid under particularly adverse conditions, i.e. at room temperature, without stabilisation of the nickel complex and with an Al/Ni ratio of 14/1.

TABLE 1

| Ex. | Catalyst (g.) | EtAlCl$_2$ (ml.) | Chlorobenzene (ml.) | Time (mins.) | Temp. (° C.) | C$_6$ product (g.) | Higher oligomer (g.) | Rate, kg./hr./ g. Ni | Hexane isomer ratio |
|---|---|---|---|---|---|---|---|---|---|
| 2 | A (.163) | 0.2 | 32 | 15 | $-30/_{10}$ | 52 | Trace | 11.3 | 23:69:8 |
| 3 | B (.2) | 0.2 | 32 | 25 | $-20/_{12}$ | 44 | ca. 19 | 10.0 | 74:24:2 |
| 4 | B (.2) | 0.2 | 72 | 68 | $-18/_{15}$ | 284 | ca. 260 | 31.3 | 65:31:5 |
| 5 | B (.089) | 0.2 | 72 | 95 | $-11/_{10}$ | 390 | ca. 410 | 75.0 | |
| 6 | C (.2) | 0.2 | 32 | 60 | $-10/_{25}$ | 55 | ca. 5 | 4.3 | 7:68:25 |
| 7 | D (.2) | 0.2 | 35 | 47 | $-11/_{5}$ | 49 | Trace | 3.8 | 11:68:21 |
| 8 | E (.2) | 0.2 | 30 | 17 | $-3/_{14}$ | 18 | Trace | 3.8 | 8:70:22 |
| 9 | A (.2) | 0.2 Et$_2$AlCl | 30 | 92 | $+8/_{30}$ | 37 | Trace | 1.1 | 11:71:18 |
| 10 | A (.2) | 0.5 g. AlBr$_3$ | 35 | 22 | $-7/_{16}$ | 14 | ca. 39 | 6.4 | 3:75:21 |

TABLE 2

| Example | Butene | Propylene (l/hr.) | Catalyst A (g.) | EtAlCl$_2$ (ml.) | PhCl (ml.) | Time (min.) | Temp. (° C.) | Rate | Product C$_5$–C$_8$ (g.) | Higher oligomers (g.) | C$_6$:C$_7$:C$_8$ |
|---|---|---|---|---|---|---|---|---|---|---|---|
| 12 | | 8 | 0.5 | 0.6 | 10 | 303 | $-3/26$ | 0.42 | 97 | ca. 11 | 1:9:90 |
| 13 | $\Delta^1$ | 30 | 0.5 | 0.6 | 10 | 118 | $-10/32$ | 0.59 | 64 | ca. 2 | 33:44:22 |
| 14* | Cis $\Delta^2$ | 30 | 0.5 | 0.6 | | 82 | $-2/35$ | 0.97 | 71 | ca. 4 | 38:45:17 |
| 15 | Trans $\Delta^2$ | 30 | 0.5 | 0.6 | 10 | 71 | $-5/31$ | 1.25 | 80 | ca. 3 | 27:44:30 |
| 16 | $\Delta^1$ | 30 | 1.25 | 1.5 Et AlCl | 10 | 120 | $+1/20$ | 0.38 | 108 | Trace | 39:38:23 |

*Unreacted butene consisted of 2.4% $\Delta^1$, 74% Trans $\Delta^2$, 23% cis $\Delta^2$.

EXAMPLE 19

A solution of bis(tributylphosphine)nickel dichloride (0.1 g.) in chlorobenzene (50 ml.) was saturated with propene and then treated with ethyl aluminium dichloride (0.35 g.). A yellow colour was generated in the solution after about 30 seconds and persisted for several hours, there was no deposition of solid. This example demonstrates the stabilising effect obtained by contacting the nickel complex with an olefin before adding the Lewis acid.

EXAMPLE 20

Bis(tributylphosphine)nickel dichloride (0.02 g.) was dissolved in chlorobenzene (100 ml.) saturated with propene, and the solution cooled to −5°. Ethyl aluminium dichloride (0.07 g.) was then added and excess propene added continuously for 1 hour, during which time the reaction mixture was maintained at 10° C. The yield of hexenes was 450 g.

EXAMPLE 21

Bis(tributylphosphine)nickel dichloride (0.02 g.) was dissolved in chlorobenzene (100 ml.) and ethyl aluminium dichloride (0.7 g.) added, followed by a stream of propene. Excess propene was then added for 1 hour, during which time the reaction temperature was maintained at 10° C. The yield of hexenes was 163 g. This example is included by way of comparison only. It will be seen that the yield of hexenes is considerably lower than that in Example 20 where the nickel compound was contacted with propene *before* the aluminium compound was added.

EXAMPLES 22–25

A series of catalyst solutions were prepared as follows:
Bis(tributylphosphine)nickel dichloride (0.5 g.) was dissolved in pure butene-1 (50 ml.) and ethyl aluminium dichloride (0.56 g.) added to the solution. When the yellow mixed catalyst solution had formed a propene stream was admitted followed by a mixed propene/butent-1 stream when the reaction temperature had reached 12° C. Isobutene was then admitted to the inlet gas stream after a certain period of time ($t$) and the reaction continued for about 6 hours. After this time the dimeric products were isolated and the polymeric residue examined. The results of experiments in which the time ($t$) was varied, are given in Table 3 below. The Al/Ni ratio was 4.8/1 in each case.

TABLE 3

| Example | Time (t) | Residue Physical form | Weight, g. |
| --- | --- | --- | --- |
| 22 | 2 mins | Semi-solid | 130 |
| 23 | 15 mins | Thick oil | 100 |
| 24 | 45 mins | Thick oil | 33 |
| 25 | 60 mins | Mobile oil | 11 |

After 45 minutes conditioning time ($t$) the amount and nature of the polymeric residue allowed separation of the dimeric product without difficulty.

EXAMPLE 26

The procedure of Examples 22–25 was repeated except that a 1/1 mixture of butene-1/isobutene was used to dissolve the bis(tributylphosphine)nickel dichloride and to stabilise it. Although it was 40 minutes before any further isobutene was admitted to the system, the final residue contained 120 g. of a semi-solid polymer. This example shows that isobutene may not be used in the stabilising process if it is also present in the stream to be dimerised.

EXAMPLE 27

Bis(tributylphosphine)nickel dichloride (0.2 g.) was dissolved in 150 ml. of a 1/1 butene-1/isobutene mixture and the solution treated with ethyl aluminium dichloride (0.84 g.). The resulting mixture was subjected to the procedure of Examples 22–25, isobutene being admitted after 2 minutes. The residue contained 210 g. of a solid polymer, demonstrating the combined adverse effects of a high Al/Ni ratio (16/1) and stabilising with an isobutene-containing olefin.

EXAMPLES 28–31

The general procedure of Example 20 was repeated using the weights of bis(tributylphosphine)nickel dichloride shown in Table 4 below. In each case the nickel complex was dissolved in 150 ml. of chlorobenzene and sufficient ethyl aluminium dichloride added to give an Al/Ni ratio of 15/1. The reaction time in each case was 45 minutes at a temperature ranging from 15 to 20° C. It will be seen from Table 4 that there was a region from about 0.1 to 0.3 g. of nickel compound in the reaction mixture where the concentration of nickel complex reached a maximum effective value. This was equivalent to approximately 0.5 to 2.0 mM./litre when allowance had been made for the average volume of liquid reactants during the process. Similar maximum values may be readily determined for other catalysts in the same way.

TABLE 4

| Example | $(Bu_3P)_2NiCl_2$ wt. in g. | Dimer produced, g./hour |
| --- | --- | --- |
| 28 | 0.47 | 290 |
| 29 | 0.30 | 264 |
| 30 | 0.075 | 219 |
| 31 | 0.020 | 105 |

EXAMPLE 32

Bis(tributylphosphine)nickel dichloride (0.4 g.) was dissolved in a $C_{12}$ hydrocarbon (30 ml.). The solution was introduced into an autoclave, cooled below −20° C. Ethyl aluminium dichloride (0.33 g.) and butene-1 (120 ml.) were then added. The vessel was sealed, allowed to warm up to 5° C. when iso-butene (40 ml.) and butene-1 (200 ml.) were added. Propene was applied at a constant pressure of 70 p.s.i.g. and the vessel was maintained at 50° C. After 6 hours, the product was recovered and 345 g. of mixed dimers were obtained on distillation. The product distribution ($C_6:C_7:C_8$) was 69:28:3. High molecular weight polymer was absent from the heavy ends.

EXAMPLE 33

Bis(tributylphosphine)nickel dichloride (0.2 g.) was dissolved in chlorobenzene (100 ml.), saturated with propene, followed by aluminium bromide (0.5 g.). Propene was passed in at atmospheric pressure, the temperature being maintained at 10° C. After an hour, 38 g. of hexenes were recovered.

EXAMPLE 34

Bis(triphenylphosphine)cobalt dichloride (0.2 g.) was dissolved in chlorobenzene (100 ml.), saturated with propene. Ethyl aluminium dichloride (0.5 g.) was added and propene was passed in. The temperature was maintained at 10° C. After an hour, 20 g. of hexenes were isolated.

EXAMPLE 35

Bis(diphenyl phosphino)methane nickel dibromide (0.2 g.) was dissolved in chlorobenzene (30 ml.). The solution was cooled, saturated with propene and ethyl aluminium dichloride (0.2 g.) was added. Propene was passed in for two hours, and the temperature was maintained between 18 and 22° C. 22 g. hexenes was recovered by distillation.

EXAMPLE 36

The procedure of Example 35 was repeated using 1,2-bis(diphenyl phosphino)ethane nickel dibromide (0.2 g.). In 2½ hours, 18 g. hexenes were produced.

EXAMPLE 37

Nickel naphthenate (0.1 ml.) and tris(monochloromethyl)phosphine (0.61 g.) were dissolved in chlorobenzene (50 ml.). The solution was cooled below 0° C. and ethyl aluminium dichloride (1.15 g.) was added. After passing propene through the catalyst solution at 10° C. for an hour, 80 g. of hexenes were recovered.

EXAMPLE 38

Nickel naphthenate (0.1 ml.) and diphenylchlorophosphine (0.75 g.) were dissolved in chlorobenzene (50 ml.). The solution was cooled below 0° C. and ethyl aluminium dichloride (1.15 g.) was added. After passing propene through the solution for 20 minutes 15 g. of hexenes were recovered.

EXAMPLE 39

Triphenyl arsine (0.1 g.) and nickel naphthenate (0.1 ml.) were dissolved in chlorobenzene (100 ml.). The solution was cooled and saturated with propene. Ethyl aluminium dichloride (0.23 g.) was added and propene was passed in at atmospheric pressure for 1 hour, while the temperature was maintained at 10° C. The yield of hexenes was 4 g.

EXAMPLE 40

Bis(trimethylphosphine)nickel dichloride (0.02 g.) was dissolved in chlorobenzene (100 ml.). The solution was cooled below 0° C. and was saturated with propene. Ethyl aluminium dichloride (0.07 g.) was added and propene was passed in at atmospheric pressure for 1 hour, while the temperature was maintained at 10° C. The yield of hexenes was 76 g.

EXAMPLE 41

The procedure of Example 40 was repeated using 0.02 g. of a nickel compound of the formula:

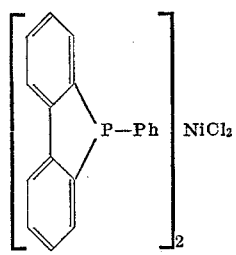

Under otherwise identical conditions the yield of hexenes was 45 g.

EXAMPLE 42

The procedure of Example 40 was repeated using bis-(triethylphosphine)nickel diisothiocyanate (0.02 g.). Under otherwise identical conditions the yield of hexenes was 16 g.

EXAMPLES 43–48

Propylene was dimerised at atmospheric pressure in a continuous reactor, by contacting it with a solution of bis(tributylphosphine)nickel dichloride (except where stated otherwise) and ethyl aluminium dichloride in isooctane. Propylene and catalyst components were fed in continuously. The reactor was provided with an overflow device to remove the products continuously, and to maintain a constant volume of reaction medium. The products were analysed at the steady state. Details are shown in Table 5.

TABLE 5

| Ex. | Catalyst concentration | | Residence time (mins.) | Temperature, °C. | Reactor volume, ml. | Product ($C_6$/l./hr.) |
|---|---|---|---|---|---|---|
| | Ni complex, g./litre | EtAlCl$_2$, g./litre | | | | |
| 43 | 0.93 | 0.90 | 38 | 10 | 167 | 490 |
| 44 | 0.35 | 0.41 | 45 | 10 | 169 | 150 |
| 45 [1] | 0.79 | 0.75 | 36 | 10 | 144 | 650 |
| 46 | 1.09 | 0.93 | 81 | 47.5 | 141 | 270 |
| 47 [2] | 0.11 0.58 | 1.07 | 51 | 48 | 150 | 200 |
| 48 [3] | 0.0065 0.47 | 1.05 | 53 | 39.5 | 142 | 135 |

[1] Reaction medium contained 14% by weight of chlorobenzene.
[2] Catalyst comprises a mixture of nickel naphthenate and tributyl phosphine: concentrations quoted are nickel (as metal) g./litre, followed by phosphine in g./litre.
[3] Catalyst comprises a mixture of nickel naphthenate and triphenyl phosphine: concentrations as in (b).

EXAMPLES 49–52

The following examples illustrate the continuous dimerisation of propylene in the presence of a catalyst formed from an alkyl aluminium chloride, nickel naphthenate and triphenyl phosphine. Liquid propylene was continuously passed into a stirred reactor under autogenous pressure. A solution of nickel naphthenate and triphenyl phosphine in a $C_{12}$ paraffinic hydrocarbon was continuously introduced into the propylene feed line while a 25% solution of an alkyl aluminium chloride in the same hydrocarbon was introduced into the propylene feed line, at a point nearer to the reactor. The alkyl aluminium chloride was ethyl aluminium sesquichloride in Examples 49 and 50 and ethyl aluminium dichloride in Examples 51 and 52.

Reaction conditions and results are given in Table 6.

TABLE 6

| Example | 49 | 50 | 51 | 52 |
|---|---|---|---|---|
| Duration of Expt. hours | 4 | 16 | 12 | 4 |
| Temperature, °C | 40 | 60 | 60 | 40 |
| Propylene rate, ml./hr | 1,030 | 500 | 510 | 370 |
| Propylene residence time, hrs | 2.1 | 4.4 | 4.1 | 5.9 |
| Percent conversion propylene | 45 | 71 | 53 | 75 |
| Percent yield propylene dimer | 98 | 90 | 86 | 85 |
| Rate of formation of dimer moles/hr./litre of reactor volume | 1.5 | 1.0 | 0.74 | 0.75 |
| Catalyst usage per kg. dimer: | | | | |
| Ni mg | 4.0 | 2.9 | 4.2 | 2.9 |
| PPh$_3$ mg | 160 | 118 | 168 | 118 |
| Al alkyl chloride solution ml | 4.0 | 3.1 | 4.1 | 2.7 |

EXAMPLE 53

Bis(tributylphosphine)nickel dichloride (1.0 g.) was dissolved in 20 ml. deoxygenated pentane to give a red solution, which was stored under nitrogen. Ethyl aluminium dichloride (3 ml.) was dissolved in 15 ml. pentane. The solutions were cooled to −80° C. and the solution of aluminium compound was added dropwise to the nickel solution. The red colour was discharged and a blue solid separated as the solution became colourless. The product was washed with pentane at −80° C. and dried in vacuo. Analysis indicated a molar ratio of 3/1 aluminum/nickel. A solution of the blue compound in methylene chloride was effective as a catalyst for the dimerisation of propene to give a dimer distribution similar to that obtained in Example 1.

What we claim is:

1. A process for oligomerizing a monoalkene feedstock containing isobutene whereby the formation of polymers of isobutene is avoided, which comprises contacting said feedstock with a catalyst consisting essentially of the product formed by mixing an aluminium alkyl halide and a nickel phosphine halide with the Al/Ni atomic ratio being maintained in the range from 3/1 to 5/1 and by reducing the isobutene polymerization activity of said mixture by contacting said mixture before use as a catalyst for the oligomerization of the monoalkene feedstock containing isobutene, with an essentially isobutene-free monoalkene or mixture of monoalkenes.

2. A process according to claim 1 wherein said nickel phosphine halide is bis (tributylphosphine) nickel dichloride.

3. A process according to claim 1 wherein said aluminium alkyl halide is diethyl aluminium chloride.

4. A process according to claim 1 wherein said aluminium alkyl halide is ethyl aluminium dichloride.

References Cited

UNITED STATES PATENTS

| | | | |
|---|---|---|---|
| 3,306,948 | 2/1967 | Kealy | 260—680 |
| 3,355,510 | 11/1967 | Cannell et al. | |
| 3,390,201 | 6/1968 | Drew | 260—676 |

PAUL M. COUGHLAN, Jr., Primary Examiner

U.S. Cl. X.R.

252—429